United States Patent [19]
House

[11] 3,937,361
[45] Feb. 10, 1976

[54] ADJUSTABLE SELF-LEVELING PLATE DISPENSER

[75] Inventor: Bruce F. House, Miami, Fla.

[73] Assignee: Shelley Manufacturing Company, Miami, Fla.

[22] Filed: July 17, 1974

[21] Appl. No.: 489,384

[52] U.S. Cl. ............................................. 221/242
[51] Int. Cl.² .......................................... A47F 1/06
[58] Field of Search ....... 221/227, 279, 242; 312/71

[56] References Cited
UNITED STATES PATENTS

| | | | |
|---|---|---|---|
| 3,057,515 | 10/1962 | Loeser | 221/242 X |
| 3,181,919 | 5/1965 | Shelley | 312/71 |
| 3,428,185 | 2/1969 | Vorndran | 312/71 X |

Primary Examiner—Stanley H. Tollberg
Attorney, Agent, or Firm—Ernest H. Schmidt

[57] ABSTRACT

An adjustable self-leveling dispenser for dispensing various peripheral sizes, selectively, of stacked plates, dishes or platters supported upon a resilient pressure head within a plate well or tank. A rectangular tank within which the stacked plates or platters are received for dispensing is provided, in each corner, with vertically disposed guide rod members step-wisely adjustable along a range of distances outwardly of the center of the pressure head to serve as abutment slide means for guiding peripheral edge portions of any selected size of a wide range of sizes of stacked plates, dishes or platters to be dispensed.

8 Claims, 7 Drawing Figures

U.S. Patent Feb. 10, 1976 Sheet 1 of 2 3,937,361
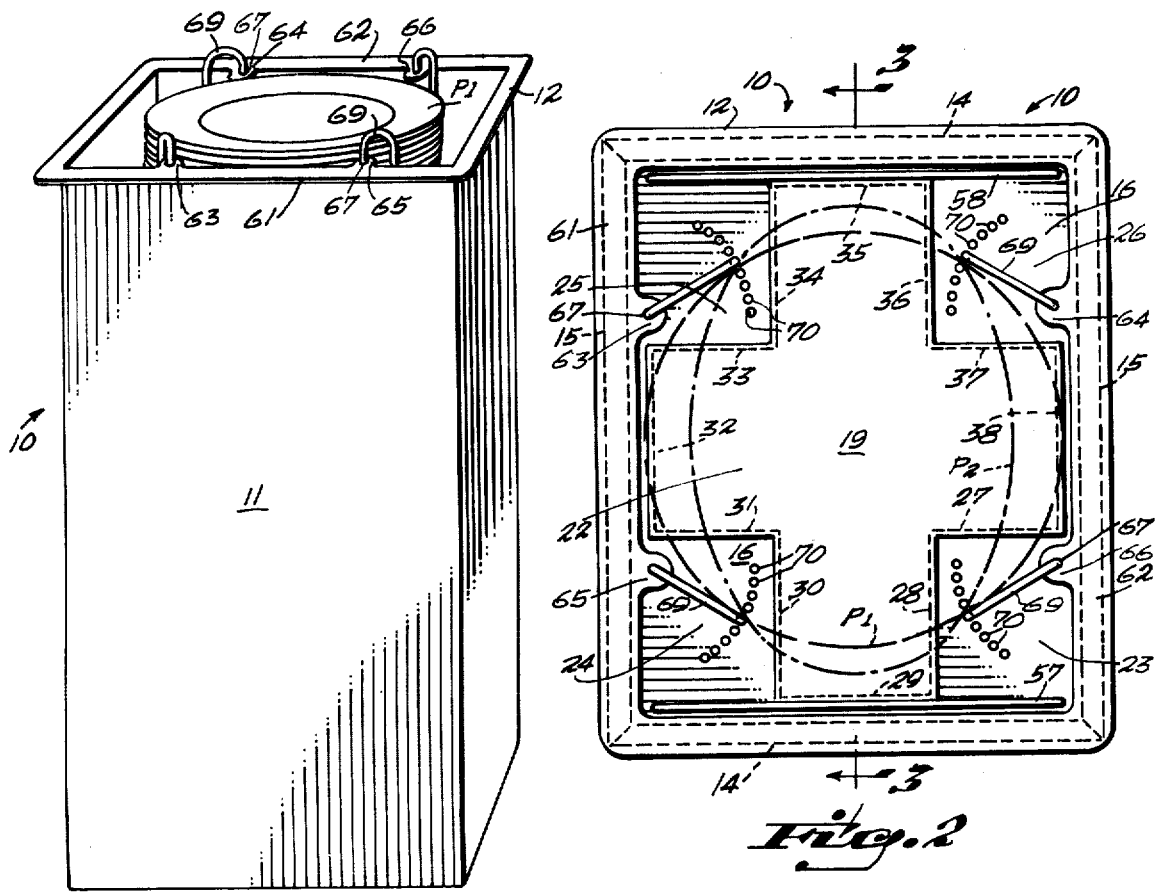
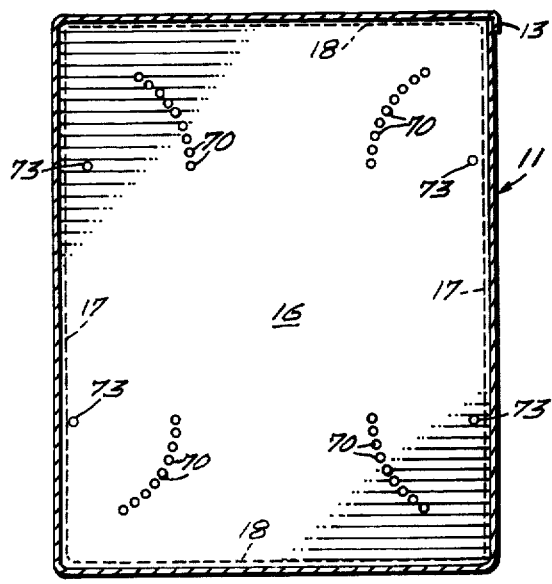

ADJUSTABLE SELF-LEVELING PLATE DISPENSER

This invention relates to self-leveling plate, dish or platter dispensers of the type used in cafeterias and restaurants, for example, and is directed particularly to an adjustable self-leveling plate dispenser wherein adjustment can be made for accommodating for dispensing, selectively, any one of a range of various peripheral sizes of plates, dishes or platters, whether of round or oval shape.

The use of self-leveling plate dispensers in the form of cylindrical wells or tanks for receiving stacked plates, dishes or platters to be dispensed and comprising a spring-loaded pressure head mechanism operative to push the stacked plate upwardly in the well to a level at the top of the stack from which the uppermost plate or platter can readily be grasped for use is well known. Heretofore, however, the peripheral size of the well or tank within the stacked plates or platters were received for dispensing determined the peripheral size and shape of the plates or platters that could be accommodated. This is for the reason that the plates or platters were guidingly constrained for vertical movement by the interior peripheral surface of the well or tank of the dispenser containing the stacked plates or platters. Thus, in the dispensing of round plates, dishes or platters, a round dispenser well or tank of slightly greater peripheral size was required, whereas if oval plates or platters were to be dispensed, a separate oval well or tank of corresponding size was required.

It is, accordingly, the principal object of this invention to provide a novel and improved self-leveling plate dispenser including readily adjustable mechanism for accommodating to use thereof with any one, selectively, of a plurality of peripheral sizes, over a wide range, of stacked plates, platters or dishes, irrespective of whether such plates, platters or dishes are of circular or oval shape.

A more particular object of the invention is to provide an adjustable self-leveling plate or platter dispenser of the above nature wherein the dispensing container is in the form of a rectangular tank, and wherein the adjustable mechanism accommodating to use of various sizes and shapes of stacked plates, dishes or platters comprises vertically disposed guide rod members within each corner of the tank, each of which is step-wisely adjustable along a range of distances extending outwardly of the center of the pressure head to serve as abutment slide means for guiding peripheral edge portions of any selected one of a wide range of incremently increasing sizes and shapes of stacked plates, dishes or platters to be dispensed.

Yet another object of the invention is to provide an adjustable plate dispenser of the above nature wherein the guide rod members comprise reversely-bent, laterally off-set edge portions pivotally journalled with respect to corner portions of the tank to permit step-wise arcuate adjustment of the guide rod members along an arcuate path extending outwardly of the center of the dispenser pressure head.

Another object of the invention is to provide an adjustable self-leveling plate or platter dispenser of the above nature which will be simple in construction, compact, easy to operate, and fool-proof, effective and durable in operation.

Other objects, features and advantages of the invention will be apparent from the following description when read with reference to the accompanying drawings. In the drawings, wherein like reference numerals denote corresponding parts throughout the several views:

FIG. 1 illustrates, in perspective, an adjustable plate dispenser embodying the invention;

FIG. 2 is a top view of the plate dispenser shown in FIG. 1;

FIG. 4 is a horizontal cross-sectional view taken along the plane indicated at 4—4 of FIG. 3 in the direction of the arrows;

Figure 3:
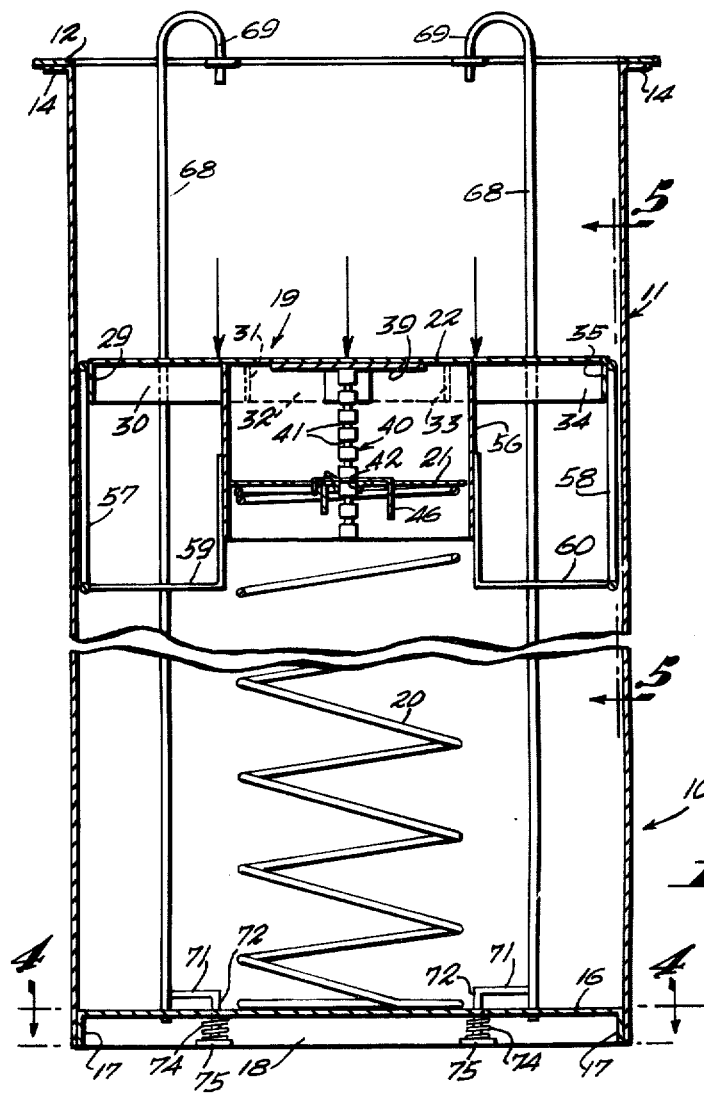
FIG. 3 is a vertical cross-sectional view of a plate dispenser, taken along the plane indicated at 3—3 of FIG. 2, in the direction of the arrows.

Referring now in detail to the drawing, reference numeral 10 in FIGS. 1, 2 and 3 designates, generally, an adjustable, self-leveling plate dispenser embodying the invention. The self-leveling plate dispenser comprises a rectangular tank 11 having a rectangular peripheral flange 12 spot-welded or otherwise secured about the upper end of said tank. The tank 11 is fabricated by bending sheet metal, preferably stainless steel, into rectangular shape and welding together an overlapped corner portion as indicated at 13 of FIG. 4. The upper end of the tank is preferably provided along each side with rectangularly outwardly-bent flange portions 14, 14 and 15, 15 against upper surface portions of which the rectangular flange 12 is secured.

A bottom panel 16, also of sheet metal such as stainless steel, encloses the lower end of the tank 11, said bottom panel being provided with short, downwardly-extending side wall portions 17, 17 and 18, 18, which are spot welded or otherwise affixed with respect to lower marginal end portions of the said tank.

Vertically slidably disposed within the rectangular tank 11 is a pressure head designated, generally, by reference numeral 19. A helical compression spring 20 is constrained axially between the bottom panel 16 and a circular adjustment disc 21 vertically adjustably mounted with respect to the pressure head. As is hereinbelow more particularly described, the pressure head 19 serves to automatically elevate for ready dispensing, one at a time, plates, platters or the like stacked within the tank upon said pressure head.

The pressure head 19 comprises a plate support member 22 which, as illustrated in FIG. 2 is in the general shape of a cross. The plate support member 22 is preferably fabricated of bent sheet metal, such as of stainless steel, its cross shape being defined by rectangular corner cut-outs recesses 23, 24, 25 and 26. Marginal peripheral edge portions of the plate support member 22 are bent downwardly, as indicated at 27 through 38 in FIG. 2, to enhance the rigidity of said plate support member.

Figure 6:
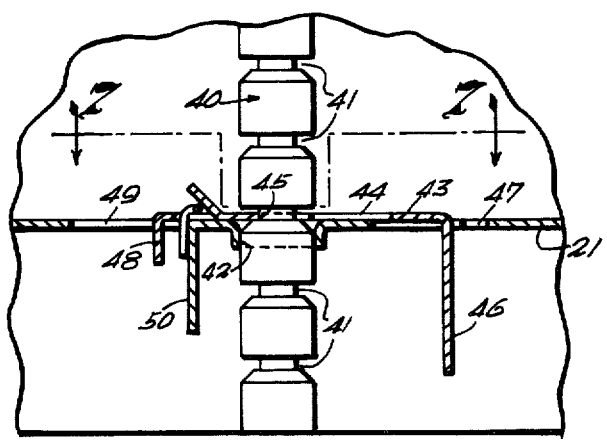
FIG. 6 is a vertical view, partly in cross-section, illustrating mechanical details of the head adjustment mechanism, as seen in FIG. 3 but on a substantially increased scale.
Figure 7:
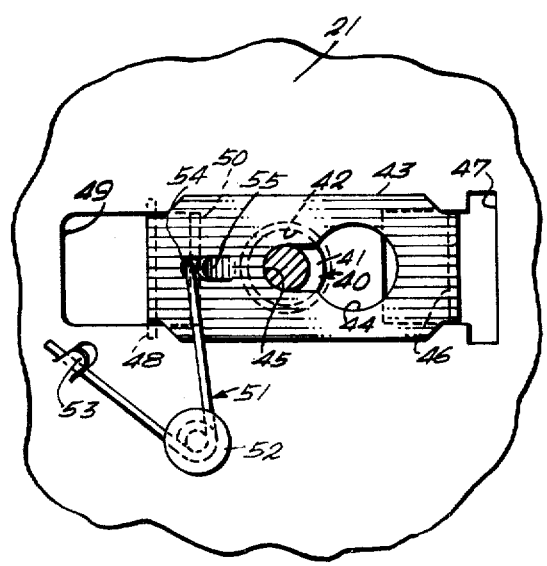
FIG. 7 is a fragmentary cross-sectional view taken along the line 7—7 of FIG. 6 in the direction of the arrows and further illustrating details of the head adjustment mechanism.

Centrally fixed against the underside of the plate support member 22 is a circular mounting plate 39 affixed to and extending downwardly centrally of which is an adjustment rod 40 provided with a plurality of equidistantly axially-spaced annular grooves 41. As best illustrated in FIGS. 3, 6 and 7, the adjustment disc 21 is provided with a central opening 42 through which the adjustment rod 40 extends. Means is provided for adjustably securing the adjustment disc 21 at spaced positions along the adjustment rod 40 in increments controlled by the spacing between the annular grooves 41. To this end, a stamped metal head adjustment latch member 43 is provided, said latch member being disposed for limited sliding motion upon an upper surface portion of the circular adjustment disc 21 surrounding the central opening 42 therein. As best illustrated in FIGS. 6 and 7, latch member 43 is provided with a circular opening 44 of sufficient diameter to permit free passage therethrough of the adjustment rod 40, which circular opening 44 extends laterally into an arcuate opening 45 of sufficiently reduced diameter to permit passage thereinto of the reduced diameter annular groove portions 41 of said adjustment rod. As illustrated in FIG. 6, the latch member 43 is also provided at one end with a downwardly-directed portion 46 extending through an opening 47 of the circular adjustment disc 21, and at the other end with a downwardly-directed portion 48 extending through an opening 49 in said adjustment disc, said opening 49 being provided by stamping downwardly a tab portion 50 from said adjustment disc.

As best illustrated in FIG. 7, a helical torsion spring 51 mounted about an upstanding stud member 52 affixed to the circular adjustment disc 21 has one end constrained within the bight defined by an upwardly-struck lug 53 in said adjustment plate and the other end bent through an opening 54 in the latch member 43 defined by an upwardly struck lug 55 in said latch member. It will be understood that the latch member 43 is normally constrained to the right, as illustrated in FIG. 7, whereat any selected one of the adjustment rod annular grooves 41 can be captured or latched therein. It will thus be understood that, upon withdrawal of the pressure head 19 from the tank 11, the downwardly extending portion 46 of the latch member 43 can be utilized for manually sliding said latch member to the left against the urging of torsion spring 51 to permit temporary free passage of the adjustment rod 40 through circular opening 44, for adjustably positioning and securing the adjustment disc along said adjustment rod.

Figure 5:
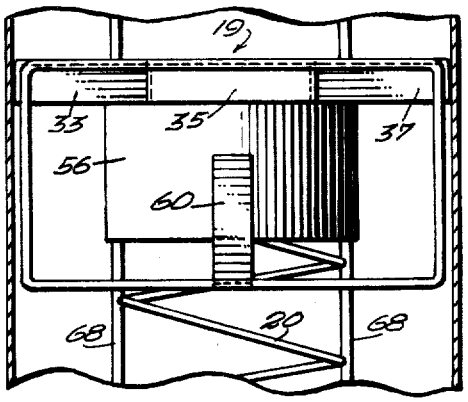
FIG. 5 is a partial, vertical cross-sectional view taken along the plane indicated at 5—5 of FIG. 3 in the direction of the arrows.

As illustrated in FIGS. 3 and 5, a cylindrical housing 56, also preferably of bent sheet metal such as stainless steel, is welded or otherwise secured against the underside of the plate support member 22 in slightly spaced coaxial relation with respect to the circular adjustment disc 21. The cylindrical housing 56 is of such diameter as to permit free axial passage therein of the helical compression spring 20, and serves to constrain upper end portions of said compression spring against lateral displacement.

Means is provided to minimize the possibility of canting or wedging of the comparatively shallow plate support member 22 as it moves up and down within the tank 11. To this end, the opposed, downwardly-bent marginal portions 29 and 35 thereof have welded or otherwise affixed thereto opposed, downwardly-extending rectangular loop members 57, 58, preferably of bent stainless steel rod, which are closely spaced with respect to inner wall portions of the tank, thereby guidingly constraining the pressure head 19 to parallel movement within the tank. As illustrated in FIGS. 3 and 5, opposed sheet metal angle bracket members 59, 60, welded or otherwise fixed between opposed outer portions of the cylindrical housing 56 and central lower portions of respective rectangular loop members 57, 58, serve to retain said loop members in their fixed positions.

A salient feature of the invention resides in the mechanism and means by which adjustment can be made for accommodating the plate dispenser to use with various sizes of plates or platters, whether of round or oval shape. To this end, as best illustrated in FIGS. 1 through 4, the peripheral rectangular flange 12 at the upper end of the tank 11 is integrally formed along its major side wall portions 61, 62 with laterally-opposed pairs of inwardly-extending ear members 63, 64 and 65, 66, respectively, each of which has a through opening 67. Longitudinal plate guide bars 68 having arcuately reversely-bent upper end portions 69 have their downwardly-extending upper end portions pivotally journalled in one each of the through openings 67. As best illustrated in FIGS. 2 and 4, the bottom panel 16 is provided, near each corner, with a plurality of equidistantly-spaced, arcuately-disposed through openings 70 for the selective reception of lower end portions of the respective plate guide bars 68. It is to be noted that each group of openings 70 is disposed along an arc of a circle the origin of which is coincident with the extended vertical axis of the reversely-bent portion 69 of its associated plate guide bar 68. It is further to be noted, as is best illustrated in FIG. 2, that the individual groups of through openings 70 are vertically accessible through the rectangular recesses 23, 24, 25 26, respectively, of the plate support member 22. The opposed pairs of inwardly-extending ear members 63, 64 and 65, 66, moreover, also extend into corner zones defined by plate support member cut-outs 23, 24, 25 and 26 to permit withdrawal of the pressure head 19 whenever necessary to effect relocation of adjustment disc 21, for example.

Means is provided for adjustably receiving the plate guide bar 68 in their respective sets of upper and lower through openings 67 and 70. To this end, as best illustrated in FIGS. 3 and 4, each of the guide bars 68 has welded or otherwise affixed near its lower end a right-angular off-set bar 71 having a downwardly-projecting leg portion 72 coaxial with respect to the reversely-bent upper end portion 69 of its associated guide bar 68 and receivable in respective through openings 73 in the bottom panel 16. The through opening 73 are located at the center of curvatures, respectively, of their associated sets of arcuately disposed through openings 70. As illustrated in FIG. 4, each of the leg portions of the off-set bars 71 projecting through the bottom panel 16 has circumjacently positioned thereon a helical compression spring 74 constrained in place between the underside of said bottom panel and a washer member 75 welded or otherwise affixed to the outer end thereof. It will be understood that the off-set bars 71 and their associated apring mechanism serve not only to stiffen the guide bars in their horizontally disposed positions, but also to prevent removal of said guide bars as they are lifted from one adjested position to another with respect to the openings 70.

Considering now the operation of the adjustable plate dispenser, FIG. 2 illustrates how, at a particular setting of the longitudinal plate guide bars 68 in corresponding ones of their associated openings 70 in the bottom panel 16, either round plates or platters of a certain size represented by the broken line P1, or oval plates or platters of a certain size designated by the broken line P2, are constrained to vertical movement in the tank 11 for dispensing one at a time at the top of the device while the pressure head 19 and associated compression spring 20 serve to automatically elevate a stack of such plates or platters so that the uppermost one will be in proper position for ready withdrawal. It is to be understood that the spring rate of the helical compression spring 20, which is governed by the characteristics of the spring wire, the number of coils per unit length and the diameter of the coils; and the pressure head load, which is governed by the overall length of the helical spring, will be such as to apply a substantially constant force at the bottom of the stacked plates or platters.

With further reference to FIG. 2 it will readily be understood that as the plate guide bars 68 are each step-wisely moved into corresponding openings 70 from their outer ends (nearest the corners of the tank 11) to their inner ends (nearest the interior corners of the cross-shaped plate support member 22), circular or oval plates or platters of a wide range of sizes from large to small are accommodated for self-leveling dispensing.

Because a given stack length of large plates or platters will ordinarily weigh more than the same stack length of comparatively smaller plates or platters, it will be understood that whenever readjustment of the longitudinal plate guide bar 68 is made for accommodating a different size of plates or platters, a corresponding adjustment of the adjustment disc 21 will be required, as hereinabove described, to insure that the top plate or platter of a stack will be at dispensing level at the top of a dispenser tank.

While I have illustrated and described herein only one form in which my invention can conveniently be embodied in practice, it is to be understood that this embodiment is given by way of example only and not in a limiting sense. The invention, in brief, comprises all the embodiments and modifications coming within the scope and spirit of the following claims.

What I claim as new and desire to secure by Letters Patent is:

1. In a self-leveling plate dispenser of the type having a vertically-extending, open-top tank for receiving stacked plates, dishes or platters to be dispensed and including mechanism resiliently constraining the stacked plates, dishes or platters therein in the upward direction from underneath for dispensing from the top of the tank, the improvement comprising, mechanism within the tank adapting it for vertically guiding any one, selectively, of an incrementally increasing range of peripheral sizes of such stacked plates, dishes or platters, said vertically guiding mechanism comprising a vertically disposed guide rod member within each of four corner zones of the tank and means for independently stepwisely adjusting each of said guide rod members incrementally along a range of distances extending outwardly of the central longitudinal axis of the tank, said guide rod members serving as abutment slide means for guiding peripheral edge portions of any selected one of a wide range of incrementally increasing sizes and peripheral shapes of stacked plates, dishes or platters placed in the tank for dispensing.

2. The improvement as defined in claim 1, wherein said means for step-wisely adjusting said guide rod members comprises a reversely bent, off-set end portion at the upper end of each of said guide rod members, and means pivotally journalling an outer end portion of each of said reversely bent portions of said guide rods within respective corners of the tank to provide for pivotal swinging of said guide rods along arcs extending outwardly of the central longitudinal axis of the tank.

3. The improvement as defined in claim 2, wherein the mechanism resiliently constraining stacked plates, dishes or platters comprises a plate support member arranged for vertical movement within the tank, said plate support member being provided with through openings at the zones at each interior corner of the tank for the free vertical passage therethrough of respective ones of said guide rod members.

4. The improvement as defined in claim 3, wherein said plate support member is of cruciform shape to define said through openings thereof.

5. The improvement as defined in claim 3, wherein said means for step-wisely adjusting said guide rod members comprises the bottom plate member in the tank, and a plurality of mutually-spaced, arcuately-disposed openings in each of the corner zones of said bottom plate, each of said plurality of arcuately disposed openings defining a radius of curvature substantially equal to the lateral distance between the longitudinal axes of each of said guide rod members and their respective downwardly extending offset portion, the origin of the arcuate path of each of said plurality of openings being coincident with the axis of rotation of said reversely bent portion of its respective one of said guide rod members.

6. The improvement as defined in claim 4, wherein said means for step-wisely adjusting said guide rod members comprises the bottom plate member in the tank, and a plurality of mutually-spaced, arcuately-disposed openings in each of the corner zones of said bottom plate, each of said plurality of arcuately disposed openings defining a radius of curvature substantially equal to the lateral distance between the longitudinal axes of each of said guide rod members and their respective downwardly extending offset portion, the origin of the arcuate path of each of said plurality of openings being coincident with the axis of rotation of said reversely bent portion of its respective one of said guide rod members.

7. The improvement as defined in claim 6, including mechanism for constraining lower end portions of said guide rod members to movement along an arc defined by said radius of curvature.

8. The improvement as defined in claim 7, wherein said constraining means comprises a right-angular offset member secured with respect to a lower end portion of each of said guide rods, each of said off-set members having a downwardly-extending portion journalled in a through opening in said bottom plate coincident with the origin of its associated radius of curvature.

* * * * *